US012679992B2

(12) United States Patent
Colyer et al.

(10) Patent No.: US 12,679,992 B2
(45) Date of Patent: Jul. 14, 2026

(54) COATINGS CONTAINING BRANCHED POLYESTER POLYOLS AS PLASTICIZERS

(71) Applicant: BASF Coatings GmbH, Münster (DE)

(72) Inventors: Emerson Keith Colyer, Whitehouse, OH (US); Ali A. Rihan, Whitehouse, OH (US)

(73) Assignee: BASF COATINGS GMBH, Muenster (DE)

( * ) Notice: Subject to any disclaimer, the term of this patent is extended or adjusted under 35 U.S.C. 154(b) by 190 days.

(21) Appl. No.: 17/757,996

(22) PCT Filed: Dec. 30, 2020

(86) PCT No.: PCT/EP2020/088015
§ 371 (c)(1),
(2) Date: Jun. 24, 2022

(87) PCT Pub. No.: WO2021/136800
PCT Pub. Date: Jul. 8, 2021

(65) Prior Publication Data

US 2023/0051933 A1 Feb. 16, 2023

(30) Foreign Application Priority Data

Dec. 30, 2019 (EP) .................................... 19220050

(51) Int. Cl.
*C09D 133/06* (2006.01)

(52) U.S. Cl.
CPC .................................. *C09D 133/06* (2013.01)

(58) Field of Classification Search
CPC ............. C08J 2300/202; C08G 83/005; C09D 201/005; C09D 133/06
See application file for complete search history.

(56) References Cited

U.S. PATENT DOCUMENTS

| | | | |
|---|---|---|---|
| 5,990,228 | A | 11/1999 | Eichman et al. |
| 2016/0017175 | A1 | 1/2016 | Colyer |
| 2019/0106592 | A1 | 4/2019 | Colyer |

FOREIGN PATENT DOCUMENTS

| | | | |
|---|---|---|---|
| CN | 106536593 | A | 3/2017 |
| WO | 03070844 | A1 | 8/2003 |
| WO | 2016008655 | A1 | 1/2016 |
| WO | 2019072553 | A1 | 4/2019 |

OTHER PUBLICATIONS

International Search Report and Written Opinion for corresponding PCT/EP2020/088015, mailed Apr. 15, 2021; 8 Pages.
Applied Technical Services, Gravelometer Testing, https://atslab.com/materials-testing/gravelometer-testing/, 6 pages.
ASTM International, "Standard Test Methods for Mandrel Bend Test of Attached Organic Coatings", Designation: D522/D522M-17, 2 pages.
Byk, Conical Mandrel Tester, https://www.byk-instruments.com/en/Physical-Properties/Impact . . . , 4 pages.
Park, Kinam, "Plasticizers in Various Industrial Products", 92 pages (2001).
Momentive, Technical Data Sheet, Cardura E10P, 3 pages (2012).
SpecialChem, Flexibility of Paints and Coatings: Evrything that You'll Want to Know, https://coatings.specialchem.com/coatings-properties/flexibility, 11 pages.

*Primary Examiner* — Catherine S Branch
*Assistant Examiner* — Huihong Qiao
(74) *Attorney, Agent, or Firm* — Armstrong Teasdale LLP

(57) ABSTRACT

Described herein is a coating composition including (A) a physically curing, reactively self-curing and/or externally curing component, including, based on a total solids content of component (A), from 0.1% by weight to about 2.5% by weight of a branched polyester polyol, preparable by: (a) reacting a polyol including at least three hydroxyl groups with an aliphatic dicarboxylic acid having from 6 to 36 carbon atoms or an esterifiable derivative of the aliphatic dicarboxylic acid to form a hydroxyl-functional first intermediate product; (b) reacting the first intermediate product with a cyclic carboxylic acid anhydride to form a carboxylic acid-functional second intermediate product; and (c) reacting the second intermediate product with an epoxide-functional compound having one epoxide group to form the branched polyester polyol; and (B) a crosslinking component in case component (A) includes one or more externally curing components; and optionally (C), a diluent component.

17 Claims, No Drawings

COATINGS CONTAINING BRANCHED POLYESTER POLYOLS AS PLASTICIZERS

CROSS-REFERENCE TO RELATED APPLICATIONS

This application is a U.S. National Phase Application of PCT/EP2020/088015, filed Dec. 30, 2020, which claims the benefit of priority to European Patent Application No. 19220050.9, filed Dec. 30, 2019, the entire contents of which are hereby incorporated by reference herein.

FIELD OF THE INVENTION

The invention relates to coating compositions containing branched polyester polyols, a method of coating a substrate with such coating compositions and the use of branched polyester polyols as plasticizers in coating compositions.

BACKGROUND

While film forming resins are responsible for the protective effect of a coating, it only becomes possible to process them because of organic or inorganic solvents, and while pigments generate optical attractiveness through chroma and effect, it is the plasticizers and additives as coating auxiliaries which have the varied and important task to optimize the coating composition with regard to coating application and other necessary film properties. Plasticizers typically serve to reduce the film forming temperature and elasticize the coating. In general, they act on a physical level. Since many film forming agents do not provide a high level of hardness of the coating while providing a good elasticity at the same time, plasticizers are used to overcome this dilemma.

When chain mobility of film forming resins is restricted by molecular interaction, for example by strong van-der-Waals' forces, the task of a plasticizer is to reduce or to entirely prevent the formation of such bridging forces. This can be achieved by having plasticizing carried out during the manufacture of the film forming resin by incorporation of elasticizing segments or monomers which sterically hinder such interaction. Such system of influencing the elasticity in advance, i.e. during manufacture of resins, is termed inner plasticization.

In many cases, inner plasticization of resins cannot be used for reasons of poor processability or non-optimum film properties. In such cases a so-called secondary elasticizing or external elasticizing of resins must be carried out by external plasticizers. External plasticizers are typically not used during the manufacture of the film forming resin and are therefore not chemically incorporated into the film forming resins. External plasticizing can be achieved in two different ways. Either the hard film forming resin is "diluted" with a separate highly elastic resin such as some aliphatic polyesters, or classic plasticizers in the form of low molecular weight auxiliary materials such as phthalic esters (i.e. phthalates) are added to halt intermolecular interactions.

Unlike phthalic esters, the aliphatic polyesters are typically non-volatile polymeric or oligomeric solvents. They do not migrate and offer long term effects. However, in the relevant higher concentrations they often tend to produce undesirable sticky coating surfaces.

On the other hand, the use of phthalic esters is also detrimental for several reasons. First, it has been discovered that phthalates can be harmful to the liver, lungs, kidneys, and reproductive systems of animals and most likely also human beings. Therefore, there is an increased interest in finding ways to reduce or eliminate phthalates from products wherever possible. Secondly, phthalates have a very low molecular weight and tend to migrate through the coating up to its surface, accompanied by a slow evaporation from the coating, gradually decreasing the concentration of plasticizers in the film and thereby the reducing the plasticizing effect.

The present invention aims to provide a solution for the plasticizing problems of coatings by providing a non-phthalate plasticizer. This plasticizer is intended be non-volatile, i.e. to stay in the coating material, to be hazard-free regarding health issues and to act at very low additive concentrations rather than by diluting the hard film forming resins. At such concentrations, the plasticizer should not tend to cause sticky surfaces or to deteriorate other surface properties such as adhesion to adjacent layers and/or substrates. The plasticizers should further have an increased or at least comparable plasticizing effect compared to conventional plasticizing phthalates at same or similar concentrations. Furthermore, the coating compositions containing such plasticizers must be compliant with volatile organic compound (VOC regulations. Specific VOC regulatory limits vary by type of product and from country to country and state to state and even from region to region within a state sometimes and are subject to change. For example, according to US EPA CFR—2016—title 40—vol. 6—part 59—subpart B—table 1, the regulated National Rule limit for VOC in automotive refinish primers and primer surfacers is 580 g/liter. The regulated National Rule limit for VOC in automotive refinish single-stage or two-stage top coats is 600 g/liter. Similarly, according to US EPA CFR—2016—title 40—vol. 6—part 59—subpart D—table 1, the regulated National Rule limit for VOC in architectural flat interior coatings is 250 g/liter. And the regulated National Rule limit for VOC in architectural flat nonferrous ornamental metal lacquers and surface protectants is 870 g/liter. The examples offered are USA National Rule regulations. Specific state or even regional regulations are sometimes even lower.

The plasticizers as found in this application are branched polyester polyols and can be external or internal plasticizers. Further, the term "polyester" encompasses so-called "oligoesters".

Such compounds are for example known from US 2016/0017175. However, in US 2016/0017175 the coating composition includes from about 5% to about 60% by weight of the branched polyol based on the total amount of film-forming materials (also called the binder or vehicle of the coating composition). The use of the polyester polyols as plasticizers, particularly in minor additive amounts is not disclosed in US 2016/0017175.

SUMMARY OF THE INVENTION

The problems addressed by the invention are solved by providing a coating composition, comprising

- (A) a physically curing, reactively self-curing and/or externally curing component, comprising, based on the total solids content of the coating formulation from 0.1% by weight to 2.5% by weight of a branched polyester polyol, preparable by:
  - (a) reacting a polyol comprising at least three hydroxyl groups with an aliphatic dicarboxylic acid having from 6 to 36 carbon atoms or an esterifiable derivative of the aliphatic dicarboxylic acid selected from their anhydrides and esterifiable esters to form a hydroxyl-functional first intermediate product;

(b) reacting the first intermediate product with a cyclic carboxylic acid anhydride to form a carboxylic acid-functional second intermediate product; and (c) reacting the second intermediate product with an epoxide-functional compound having one epoxide group to form the branched polyester polyol; and in case of (A) being an externally curing component (B) a crosslinking component, in case (A) comprises one or more externally curing components; and optionally (C) a diluent component.

The "total solids content" of component (A) being determined by drying 0.3 g of the (A) component at 110° C. for 1 hour, per ASTM D-2369 (date: July 2010).

Of course, it is possible that more than one of the three curing mechanisms is occurs while curing the coating composition according to the invention.

For this invention, the definition of component (A) of the coating composition includes everything but the crosslinking component (B), if present for crosslinking, and the diluent component (C), which optionally is used for adjusting the viscosity prior to application of the coating composition.

Thus, component (A) comprises, but is not limited to, pigments (if any), resins (including the branched polyester polyol of this invention), and various additives and solvents exclusive of those which may be required in the crosslinking component (B) and/or diluent component (C).

The term "physically curing" means that there is no reactive curing, but rather a drying of component (A) thus leading to a cured coating.

The term "reactively self-curing" means that a reaction of one or more ingredients of component (A) leads to a cured coating.

The term "externally curing" means that a further component, namely component (B) contains one or more ingredients that react with one or more ingredient(s) of component (A) and thus a cured coating is formed.

A further object of the present invention is the use of the branched polyester polyols obtained according to the aforementioned process steps as a plasticizer in coating compositions which does not impart the undesirable physical properties to the final coating film that plasticizers sometimes do.

In the preparation of the branched polyester polyols, preferably the ratio in step (a) of moles of the polyol to moles of the dicarboxylic acid or esterifiable derivative of the aliphatic dicarboxylic acid is from about 2.0 to about 2.5 moles of the polyol per mole of the dicarboxylic acid or esterifiable derivative of the aliphatic dicarboxylic acid.

More preferred, on average about one hydroxyl group of each polyol molecule is reacted with the dicarboxylic acid in step (a).

Preferably, the equivalent ratio in step (b) of hydroxyl groups of the first intermediate product to anhydride groups of the cyclic carboxylic acid anhydride is from about 1.0 to about 1.25 equivalents of hydroxyl groups per carboxylic anhydride group.

Even more preferably, substantially all of the hydroxyl groups are reacted with an anhydride group in step (b).

Preferably, the equivalent ratio in step (c) of carboxylic acid groups of the second intermediate product to epoxide groups of the epoxide-functional compound is from about 1.0 to about 2.5 equivalents of carboxylic acid groups per equivalents epoxide groups.

The coating composition may be organic solvent-based (i.e. solvent borne) or water-based (i.e. waterborne), preferably solvent borne.

The equivalent ratio in step (c) of carboxylic acid groups of the second intermediate product to epoxide groups of the epoxide-functional compound is preferably from about 1.0 to about 1.1 equivalents of carboxylic acid groups per equivalents epoxide groups when making an organic solvent-based coating composition.

If the coating composition is waterborne, the equivalent ratio in step (c) of carboxylic acid groups of the second intermediate product to epoxide groups of the epoxide-functional compound is typically from about 1 to about 2.5 equivalents of carboxylic acid groups per equivalents epoxide groups, and unreacted carboxylic acid groups are preferably at least partially neutralized with a base.

A coating produced from the coating composition containing the branched polyol has excellent durability, low volatile organic content, and improved elasticity, particularly at low temperatures.

In this description of the invention, for convenience, "polymer" and "resin" are used interchangeably to encompass resins, oligomers, and polymers.

DETAILED DESCRIPTION

Preparation of the Polyester Polyol

Step (a)

The branched polyester polyol used in the production of the coating compositions of this invention can be prepared by a synthesis starting with step (a) of reacting a polyol comprising at least three hydroxyl groups with an aliphatic dicarboxylic acid having from 6 to 36 carbon atoms or an esterifiable derivative of the aliphatic dicarboxylic acid to form a hydroxyl-functional first intermediate product.

The aliphatic dicarboxylic acid having from 6 to 36 carbon atoms or esterifiable derivative of the aliphatic dicarboxylic acid may be linear, branched, or cyclic, whereby cyclic dicarboxylic acids most preferably include a noncyclic segment of at least about 6 carbon atoms.

Nonlimiting examples of suitable dicarboxylic acids include adipic acid, suberic acid, azelaic acid, sebacic acid, undecanedioic acid (brassylic acid), dodecanedioic acid, traumatic acid, hexadecanedioic acid (thapsic acid), octadecanedioic acid, tetradecanedioic acid, and dimer fatty acids having 36 carbon atoms. In various embodiments, α,ω-dicarboxylic acids and dimer fatty acids having 36 carbon atoms are preferred.

It is known that dimer fatty acids having 36 carbon atoms may have multiple isomers. Dimer fatty acids are commercially available, for example from BASF under the trademark EMPOL®, from Arizona Chemical under the trademark UNIDYME™, from Croda International Plc under the trademark Pripol™, and from Emery Oleochemicals as EMERY® Dimer Acids. In the production of dimer fatty acids, it is generally unavoidable to obtain products which still contain minor amounts of monomeric fatty acids, and also trimer fatty acids and higher fatty acids. Preferred dimer fatty acids are those containing only am minimum amount of monomeric fatty acids and trimer or higher fatty acids.

Esterifiable derivatives of the dicarboxylic acids having from 6 to 36 carbon atoms include their mono- or diesters with aliphatic alcohols having 1 to 4 carbon atoms, preferably the methyl and ethyl esters, as well as the anhydrides. The term "anhydrides" includes their intramolecular anhydrides and intermolecular anhydrides. Intermolecular anhydrides e.g. include anhydrides formed by condensation reaction of carboxyl groups of two of the afore-mentioned dicarboxylic acid molecules as well as the anhydride of the afore-mentioned dicarboxylic acids with an inorganic acid such as hydrochloric acid.

The aliphatic dicarboxylic acid having from 6 to 36 carbon atoms is reacted with a polyol comprising at least three hydroxyl groups. The hydroxyl groups of the polyol can be primary, secondary, and/or tertiary hydroxyl groups.

The polyol may be selected from the group consisting of triols, dimers of triols, tetrols, dimers of tetrols, trimers of tetrols, and sugar alcohols. Nonlimiting examples of suitable polyols having three or more hydroxyl groups include glycerol, trimethylolmethane, trimethylolethane, trimethylolpropane, 2,2,3-trimethylolbutane-1,4-diol, 1,2,4-butanetriol, 1,2,6-hexanetriol, tris(hydroxymethyl)aminomethane, tris(hydroxyethyl)amine, tris(hydroxypropyl)amine, erythritol, pentaerythritol, diglycerol, triglycerol or higher condensates of glycerol, di(trimethylolpropane), di(pentaerythritol), tri(pentaerythritol), pentaerythritol ethoxylate, pentaerythritol propoxylate, trishydroxymethyl isocyanurate, tris(hydroxyethyl) isocyanurate (THEIC), tris(hydroxypropyl) isocyanurate, inositols or sugars, such as glucose, fructose or sucrose, for example, sugar alcohols such as xylitol, sorbitol, mannitol, threitol, erythritol, adonitol (ribitol), arabitol (lyxitol), xylitol, duicitol (galactitol) isomalt, polyetherols with a functionality of three or more, based on alcohols with a functionality of three reacted with ethylene oxide, propylene oxide and/or butylene oxide.

Preferably, to synthesize branched polyester polyols according to the definition above, the first polyol of step (a) is at least one of the group consisting of erythritol, pentaerythritol, dipentaerythritol, tripentaerythritol, trimethylolethane, trimethylolpropane, trimethylolbutane, glycerol, ditrimethylolethane, ditrimethylolpropane, pentaerythritol ethoxylate, and pentaerythritol propoxylate.

Preferably, to synthesize branched polyester polyols according to the definition above, the ratio in step (a) of moles of the polyol to moles of the dicarboxylic acid or esterifiable derivative of the aliphatic dicarboxylic acid is from about 2.0 to about 2.5, preferably from about 2.0 to about 2.2, and more preferably from about 2.0 to about 2.07 moles of the polyol per mole of the dicarboxylic acid or esterifiable derivative of the aliphatic dicarboxylic acid. Particularly preferably, on average about one hydroxyl group of each polyol molecule is reacted with the dicarboxylic acid in step (a).

The esterification step (a) can be carried out by known, standard methods. For example, this reaction is conventionally carried out at temperatures of between about 60° C. and about 280° C. in the presence, if desired, of an appropriate esterification catalyst. Typical catalysts for the esterification polymerization are protonic acids and Lewis acids, for example sulfuric acid, para-toluenesulfonic acid, sulfates and hydrogen sulfates, such as sodium hydrogen sulfate, phosphoric acid, phosphonic acid, hypophosphorous acid, titanium alkoxides, and dialkyltin oxides, for example dibutyltin oxide, dibutyltin dilaurate, lithium octanoate, under reflux with small quantities of a suitable solvent as entraining agent such as an aromatic hydrocarbon, for example xylene, or a (cyclo)aliphatic hydrocarbon, for example cyclohexane. As a non-limiting, specific example, the polyester may include stannous octoate or dibutyltin oxide. An acidic inorganic, organometallic, or organic catalyst can be used in an amount from 0.1% by weight to 10% by weight, preferably from 0.2% by weight to 2% by weight, based on total weight of the reactants. It may be desirable to carry out the reaction step (a) free of catalyst to avoid or minimize side reactions during subsequent steps.

The esterification of step (a) can be carried out in bulk or in the presence of a solvent that is nonreactive toward the reactants. Such solvents are preferably aprotic solvents. Nonlimiting examples of suitable solvents include hydrocarbons such as paraffins or aromatics. In some embodiments it may be preferred to use n-heptane, cyclohexane, toluene, ortho-xylene, meta-xylene, para-xylene, xylene isomer mixtures, ethylbenzene, chlorobenzene and ortho- and meta-dichlorobenzene. Other solvents that may be used in the absence of acidic catalysts are ethers, such as dioxane tetrahydrofuran, for example, and ketones such as methyl ethyl ketone and methyl isobutyl ketone, for example. The solvent may be used to aid in removing by-product of the esterification reaction, azeotropically.

The amount of solvent that can be used may be at least 0.1% by weight or at least 1% by weight or at least 5% by weight, based on the weight of the starting reactants. Higher amounts of solvent may be used, but it is preferred to keep the concentration of reactants high enough to permit the reaction to be carried out in a commercially viable length of time. Examples of ranges of the solvent that may be employed are from 0.1% by weight to about 20% by weight, or from about 1% by weight to about 15% by weight, or from about 5% by weight to about 10% by weight, based in each case on the weight of the starting reactants.

The reaction may be carried out in the presence of a water-removing agent, for example molecular sieves, especially molecular sieve 4 Å, $MgSO_4$ and $Na_2SO_4$.

The reaction of step (a) is preferably carried out at temperatures of 60° C. to 250° C., more preferred at temperatures of 100° C. to 240° C. Even more preferred, the reaction of step (a) is carried out at temperatures of 150° C. to 235° C. The reaction time depends upon known factors, which include temperature, concentration of reactants, and presence and identity of catalyst, if any. Typical reaction times may be from about 1 to about 20 hours.

To minimize final volatile organic content, as much of the solvent used to azeotrope the by-product from step (a) as is practical may be removed after completion of the reaction of step (a). Small amounts of solvents selected for their performance in the final resin can be used throughout the rest of the synthesis, for example as a flush following a reagent addition. Solvents that can react with anhydrides or epoxides, such as active hydrogen-containing compounds like hydroxy-functional solvents (e.g., alcohols and monoethers of glycols), are preferably avoided during both step (a) and subsequent reaction steps. After step (a), the reaction temperature is preferably kept below a temperature at which condensation-type esterification reactions could take place, for example kept below 150° C., for the remainder of the synthesis to minimize the chance of condensation-type esterification reactions which, after this stage of the synthesis, would have undesirable effects on the molecular weight and architecture. For example, further esterification could produce unwanted branching or an undesirably increased molecular weight. The temperature after step (a) before carrying out step (b) may be kept below 145° C., preferably below 140° C., or even below 135° C. or 130° C. depending on whether a catalyst is used during step (a) and the nature of any catalyst used.

Step (b)

The hydroxyl-functional first intermediate product prepared in step (a) is then reacted with a cyclic carboxylic acid anhydride to form a carboxylic acid-functional second intermediate product. The cyclic carboxylic acid anhydride reacts with at least one of the hydroxyl groups of the hydroxyl-functional first intermediate product to form the second intermediate product having at least one carboxyl group. Preferably, the cyclic carboxylic acid anhydride is reacted with all or substantially all of the hydroxyl groups of the first intermediate product to form the second intermediate product. The cyclic carboxylic acid anhydride reacted in step (b) may be either an aromatic or aliphatic cyclic anhydride.

Preferably, the cyclic carboxylic acid anhydride is at least one of maleic anhydride, hexahydrophthalic anhydride, methylhexahydrophthalic anhydride, tetrahydrophthalic anhydride, phthalic anhydride, succinic anhydride, trimellitic anhydride, methyltetrahydrophthalic anhydride, adipic anhydride, glutaric anhydride, malonic anhydride, itaconic acid anhydride, 5-methyl-5-nobornenedicarboxylic acid anhydride, 1,2-cyclohexanedicarboxylic acid anhydride, isatoic acid anhydride, diphenic acid anhydride, substituted anhydrides, particularly including lower-alkyl substituted acid anhydrides such as butylsuccinic acid anhydride, hexylsuccinic acid anhydride, octylsuccinic acid anhydride, butylmaleic acid anhydride, pentylmaleic acid anhydride, hexylmaleic acid anhydride, octylmaleic acid anhydride, butylglutaric acid anhydride, hexylglutaric acid anhydride, heptylglutaric acid anhydride, octylglutaric acid anhydride, alkylcyclohexanedicarboxylic acid anhydrides and alkylphthalic acid anhydrides such as 4-n-butylphthalic acid anhydride, hexylphthalic acid anhydride, and octylphthalic acid anhydride.

Even more preferred, the carboxylic acid anhydride comprises or is hexahydrophthalic anhydride.

The reaction of step (b) provides a second intermediate product with a carboxylic acid group for each molecule of cyclic carboxylic acid anhydride reacted with the hydroxyl-functional first intermediate product of step (a). Preferably, the equivalent ratio of the cyclic carboxylic acid anhydride to the first intermediate product is from about 0.8 to about 1.0, more preferably from about 0.85 to about 1.0, and most preferably from about 0.9 to about 1.0 equivalents of anhydride groups per equivalent of hydroxyl groups. Particularly preferred, one molecule or substantially one molecule of hexahydrophthalic anhydride reacts with each hydroxyl group of the first intermediate product to form the second intermediate product. It is most preferred that substantially all hydroxyl groups of the hydroxyl-functional first intermediate product are reacted with the carboxylic acid anhydride to provide an ester of the hydroxyl group and a carboxylic acid group from opening the cyclic anhydride.

The anhydride ring-opening reaction of step (b) is exothermic. The reaction temperature can be controlled, for example to not exceed about 150° C., by dividing carboxylic acid anhydride reactant addition into two or more added portions. For example, a first added portion may be about one-third to about one-half of the carboxylic acid anhydride and a second portion may be the balance of the carboxylic acid anhydride being reacted in step (b). The temperature of the reaction mixture may be allowed to cool to about 90° C. to 95° C. before each portion is added. After the first portion is added, the reaction mixture may be heated to about 110° C. to 115° C., or higher, resulting in an exotherm that may be allowed to carry the temperature of the reaction mixture upward, but not to exceed the target maximum, for example 150° C. After the exotherm, the reaction mixture may be cooled to about 90° C. to 95° C. for a second anhydride addition. Similarly, after the second anhydride addition has been completed, the reaction mixture may be heated to about 110° C. to 115° C., or higher, after which the reaction exotherm, (and additional heat, if needed), are used to bring the temperature of the reaction mixture up to, for example from about 135° C. to about 145° C. or from about 140° C. to about 145° C., where the reaction mixture is held to allow the reaction to complete. Again, the batch should preferably not exceed ° C.

Step (c)

In a third step (c), from preferably at least about two carboxylic acid groups up to all the carboxylic acid groups of the second intermediate product are reacted with an epoxide-functional compound having one epoxide group (i.e. a mono-epoxide compound) to form the branched polyester polyol.

Mono-epoxide compounds are well-known in the art, and may be characterized by the general formula:

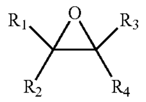

where $R_1$, $R_2$, $R_3$ and $R_4$ are each independently hydrogen or an organic radical, with the proviso that at least one of $R_1$ to $R_4$ is other than hydrogen and may contain unsaturation or heteroatoms or two of $R_1$ to $R_4$ may form a cyclic ring, which may contain unsaturation or heteroatoms.

Particularly preferred mono-epoxides of the above formula are those, wherein $R_1{=}CH_2{-}O{-}(C{=}O)_n{-}R^a$ with n being 0 or 1 and $R^a$ being a branched or linear, saturated or unsaturated hydrocarbon residue having 1 to 30, preferably 1 to 20, more preferred 1 to 16, most preferred 4 to 14 or even more preferred 6 to 12 or 8 to 10 carbon atoms; and $R_2{=}R_3{=}R_4{=}H$. In case n=1, the formula depicts a glycidyl ester, and in case n=0, the formula depicts a glycidyl ether.

For example, the epoxide-functional compound may be an epoxy ester, particularly a glycidyl ester. Glycidyl esters can be prepared by reacting a monofunctional carboxylic acid with an epihalohydrin (e.g., epichlorohydrin) under conditions well known in the art. Examples of glycidyl esters are glycidyl acetate, glycidyl propionate, glycidyl methyl maleate, glycidyl stearate, glycidyl benzoate, and glycidyl oleate. Among useful glycidyl esters are those having an alkyl group having from 7 to 17 carbon atoms. A particularly preferred glycidyl ester is a glycidyl ester of a saturated tertiary monocarboxylic acid having 9 to 11 carbon atoms. Preferably, the monofunctional carboxylic acid used to produce the glycidyl esters is a neoalkanoic acid such as, without limitation, neodecanoic or neononanoic acid. Glycidyl esters of neoacids are commercially available, e.g., under the trademark Cardura® from Momentive Specialty Chemicals, Inc., Columbus, Ohio.

Another useful class of monoepoxides is glycidyl ethers. Glycidyl ethers can be prepared by the reaction of monofunctional alcohols (e.g., n-butanol, propanol, 2-ethylhexanol, dodecanol, phenol, cresol, cyclohexanol, benzyl alcohol) with an epihalohydrin (e.g., epichlorohydrin). Useful glycidyl ethers include methyl glycidyl ether, ethyl glycidyl ether, propyl glycidyl ether, butyl glycidyl ether, pentyl glycidyl ether, hexyl glycidyl ether, heptyl glycidyl ether, octyl glycidyl ether, nonyl glycidyl ether, decyl glycidyl ether, undecyl glycidyl ether, dodecyl glycidyl ether, tridecyl glycidyl ether, tetradecyl glycidyl ether, pentadecyl glycidyl ether, hexadecyl glycidyl ether, heptadecyl glycidyl ether, octadecyl glycidyl ether, nonadecyl glycidyl ether, eicosyl glycidyl ether, beneicosyl glycidyl ether, docosyl glycidyl ether, tricosyl glycidyl ether, tetracosyl glycidyl ether, pentacosyl glycidyl ether, decenyl glycidyl ether, undecenyl glycidyl ether, tetradecenyl glycidyl ether, hexadecenyl glycidyl ether, heptadecenyl glycidyl ether, octadecenyl glycidyl ether, nonadecenyl glycidyl ether, eicosenyl glycidyl ether, beneicosenyl glycidyl ether, docosenyl glycidyl ether, tricosenyl glycidyl ether, tetracosenyl glycidyl ether and pentacosenyl glycidyl ether.

The equivalent ratio in step (c) of carboxylic acid groups of the second intermediate product to epoxide groups of the epoxide-functional compound may be from about 1.0 to about 2.5, or from about 1.0 to about 2.0, or from about 1.0 to about 1.5, or from about 1.0 to about 1.3, or from about 1.0 to about 1.1 equivalents of carboxylic acid groups per equivalents epoxide groups. The preferred range of equivalents of carboxylic acid groups to epoxide groups will vary, however, depending on whether the embodiment will be for a solvent borne or waterborne coating composition.

In one embodiment, the branched polyol is used in a solvent borne coating composition and every or substantially every carboxyl group of the second intermediate product is reacted with a monoepoxide compound.

In another embodiment, the branched polyol is used in a waterborne coating composition and on average some of the carboxyl groups are left unreacted and may be neutralized, for example with ammonia, an amine, or another base.

Coating Compositions

According to the invention the branched polyester polyol is included in component (A) of the coating composition according to the invention in an amount from 0.1% by weight to 2.5% by weight, based on the total solids content of component of the coating composition. Preferably component (A) of the coating composition according to the invention comprises from 0.2% by weight to 2.0% by weight, and even more preferred from 0.25% by weight to 1.8% by weight or to 1.5% by weight of the branched polyester polyol, based on the total solids weight of component of the coating composition.

Polymers and Resins Contained in Component (A)

The coating composition includes physically curing, reactively self-curing or externally curing resins or polymers as main film-forming ingredients, which differ from the mandatory branched polyester polyol(s).

Examples of such useful resins or polymers include (meth)acrylate polymers (also known as acrylic polymers or acrylic resins), epoxy resins, polyesters, polyethers, polyurethanes, polyols based on natural oils, such as those available under the trademark Polycins from Vertellus Specialties Inc., Indianapolis, Ind., for example a polyol based on castor oil, polysiloxanes, and those described in Mormile et al., U.S. Pat. No. 5,578,675; Lane et al US Patent Application Publication No. 2011/0135,832; and Groenewolt et al., U.S. Patent Application Publication No. 2013/0136865. Such further resins or polymers may have functionality reactive with so-called crosslinkers or may be self-crosslinking or just physically curing or drying without chemically reacting.

Preferably, the coating composition includes a further resin or polymer having hydroxyl groups, carbamate groups, or a combination of such groups.

Most preferred, the coating composition contains—beside the branched polyester polyol—at least one of a hydroxyl-functional acrylic polymer, a hydroxyl-functional polyester, or a hydroxyl-functional polyurethane.

Polyvinyl polyols, such as acrylic (polyacrylate) polyol polymers may be used as the hydroxy-functional material. Acrylic polymers or polyacrylate polymers may be copolymers of both acrylic and methacrylic monomers as well as other copolymerizable vinyl monomers. The term "(meth) acrylate" is used for convenience to designate either or both acrylate, and methacrylate, and the term "(meth)acrylic" is used for convenience to designate either or both acrylic and methacrylic.

Hydroxyl-containing monomers include hydroxy alkyl esters of acrylic or methacrylic acid. Nonlimiting examples of hydroxyl-functional monomers include hydroxyethyl (meth)acrylate, hydroxypropyl(meth)acrylates, hydroxybutyl(meth)acrylates, hydroxyhexyl(meth)acrylates, propylene glycol mono(meth)acrylate, 2,3-dihydroxypropyl(meth) acrylate, pentaerythritol mono(meth)acrylate, polypropylene glycol mono(meth)acrylates, polyethylene glycol mono(meth)acrylates, reaction products of these with epsilon-caprolactone, and other hydroxyalkyl(meth)acrylates having branched or linear alkyl groups of up to about 10 carbons, and mixtures of these, where the term "(meth) acrylate" indicates either or both of the methacrylate and acrylate esters. Generally, at least about 5% by weight hydroxyl-functional monomer is included in the polymer. Hydroxyl groups on a vinyl polymer such as an acrylic polymer can be generated by other means, such as, for example, the ring opening of a glycidyl group, for example from copolymerized glycidyl methacrylate, by an organic acid or an amine.

Hydroxyl functionality may also be introduced through thio-alcohol compounds, including, without limitation, 3-mercapto-1-propanol, 3-mercapto-2-butanol, 11-mercapto-1-undecanol, 1-mercapto-2-propanol, 2-mercaptoethanol, 6-mercapto hexanol, 2-mercaptobenzyl alcohol, 3-mercapto-1,2-proanediol, 4-mercapto butanol, and combinations of these. Any of these methods may be used to prepare a useful hydroxyl-functional acrylic polymer.

Examples of suitable comonomers that may be used include, without limitation, α,β-ethylenically unsaturated monocarboxylic acids containing 3 to 5 carbon atoms such as acrylic, methacrylic, and crotonic acids and the alkyl and cycloalkyl esters, nitriles, and amides of acrylic acid, methacrylic acid, and crotonic acid; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic alcohols containing 1 to 20 carbon atoms, such as methyl, ethyl, propyl, isopropyl, n-butyl, isobutyl, tert-butyl, hexyl, 2-ethylhexyl, dodecyl, 3,3,5-trimethylhexyl, stearyl, lauryl, cyclohexyl, alkyl-substituted cyclohexyl, alkanol-substituted cyclohexyl, such as 2-tert-butyl and 4-tert-butyl cyclohexyl, 4-cyclohexyl-1-butyl, 2-tert-butyl cyclohexyl, 4-tert-butyl cyclohexyl, 3,3,5,5,-tetramethyl cyclohexyl, tetrahydrofurfuryl, and isobornyl acrylates, methacrylates, and crotonates; unsaturated dialkanoic acids and anhydrides such as fumaric, maleic, itaconic acids and anhydrides and their mono- and diesters with alcohols such as methanol, ethanol, propanol, isopropanol, butanol, isobutanol, and tert-butanol, like maleic anhydride, maleic acid dimethyl ester and maleic acid monohexyl ester; vinyl acetate, vinyl propionate, vinyl ethyl ether, and vinyl ethyl ketone; styrene, a-methyl styrene, vinyl toluene, 2-vinyl pyrrolidone, and p-tert-butylstyrene.

The acrylic polymer may be prepared using conventional techniques, such as by heating the monomers in the presence of a polymerization initiating agent and optionally a chain transfer agent. The polymerization may be carried out in solution, for example. Typical initiators are organic peroxides such as dialkyl peroxides such as di-t-butyl peroxide, peroxyesters such as t-butyl peroxy 2-ethylhexanoate, and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis(cyclohexanecarbonitrile); and combinations of these. Typical chain transfer agents are mercaptans such as octyl mercaptan, n- or tert-dodecyl mercaptan; halogenated compounds, thiosalicylic acid, mercaptoacetic acid, mercaptoethanol and the other thiol alcohols already mentioned, and dimeric alpha-methyl styrene.

The polymerization reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes. Further details of addition polymerization generally and of polymerization of mixtures including (meth)acrylate monomers is readily available in the polymer art. The solvent or solvent mixture is generally heated to the reaction temperature and the monomers and initiator(s) are added at a controlled rate over a period of time, usually between 2 and 6 hours. A chain transfer agent or additional solvent may be fed in also at a controlled rate during this time. The temperature of the mixture is then maintained for a period of time to complete the reaction. Optionally, additional initiator may be added to ensure complete conversion.

Oligomeric and polymeric ethers may be used, including diethylene glycol, triethylene glycol, tetraethylene glycol, pentaethylene glycol, dipropylene glycol, tripropylene glycol, linear and branched polyethylene glycols, polypropylene glycols, and block copolymers of poly(ethylene oxide-co-propylene oxide). Other polymeric polyols may be obtained by reacting a polyol initiator, e.g., a diol such as 1,3-propanediol or ethylene or propylene glycol or a polyol such as trimethylolpropane or pentaerythritol, with a lactone or alkylene oxide chain-extension reagent. Lactones that can be ring opened by active hydrogen are well known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. A particularly preferred lactone is ε-caprolactone. Useful catalysts include those mentioned above for polyester synthesis. Alternatively, the reaction can be initiated by forming a sodium salt of the hydroxyl group on the molecules that will react with the lactone ring. Similar polyester polyols may be obtained by reacting polyol initiator molecules with hydroxy acids, such as 12-hydroxystearic acid.

In other embodiments, a polyol initiator compound may be reacted with an oxirane-containing compound to produce a polyether diol to be used in the polyurethane elastomer polymerization. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The oxirane-containing compound is preferably selected from ethylene oxide, propylene oxide, butylene oxide, tetrahydrofuran, and combinations of these. The alkylene oxide polymerization is typically base-catalyzed. The polymerization may be carried out, for example, by charging the hydroxyl-functional initiator compound and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition or polymerized in blocks by sequential addition. Homopolymers or copolymers of ethylene oxide or propylene oxide are preferred. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above. Polytetrahydrofuran is also known as polytetramethylene ether glycol (PTMEG). Any of the polyols mentioned above maybe employed as the polyol initiator and extended in this fashion.

Nonlimiting examples of suitable polycarbonate polyols that might be used include those prepared by the reaction of polyols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful polyols include, without limitation, any of those already mentioned. Aromatic polycarbonates are usually prepared from reaction of bisphenols, e.g., bisphenol A, with phosgene or diphenyl carbonate. Aliphatic polycarbonates may be preferred for a higher resistance to yellowing, particularly when the carbamate-functional material is used in an automotive OEM or refinish topcoat.

Polyesters polyols may be prepared by reacting: (a) polycarboxylic acids or their esterifiable derivatives, together if desired with monocarboxylic acids, (b) polyols, together if desired with monofunctional alcohols, and (c) if desired, other modifying components. Nonlimiting examples of polycarboxylic acids and their esterifiable derivatives include phthalic acid, isophthalic acid, terephthalic acid, halophthalic acids such as tetrachloro- or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxlic acid, 1,3-cyclohexane-discarboxlic acid, 1,4-cyclohexane-dicarboxlic acid, 4-methylhexahydrophthalic acid, endomethylenetetrahydropthalic acid, tricyclodecanedicarboxlic acid, endoethylenehexahydropthalic acid, camphoric acid, cyclohexanetetracarboxlic acid, and cyclobutanetetracarboxylic acid. The cycloaliphatic polycarboxylic acids may be employed either in their cis or in their trans form or as a mixture of the two forms. Esterifiable derivatives of these polycarboxylic acids include their single or multiple esters with aliphatic alcohols having 1 to 4 carbon atoms or hydroxy alcohols having up to 4 carbon atoms, preferably the methyl and ethyl ester, as well as the anhydrides of these polycarboxylic acids, where they exist. Nonlimiting examples of suitable monocarboxylic acids that can be used together with the polycarboxylic acids include benzoic acid, tert-butylbenzoic acid, lauric acid, isonoanoic acid and fatty acids of naturally occurring oils. Nonlimiting examples of suitable polyols include any of those already mentioned above, such as ethylene glycol, butylene glycol, neopentyl glycol, propanediols, butanediols, hexanediols, diethylene glycol, cyclohexanediol, cyclohexanedimethanol, trimethylpentanediol, ethylbutylpropanediol ditrimethylolpropane, trimethylolethane, tri methylolpropane, glycerol, pentaerythritol, dipentaerythritol, tris-hydroxyethyl isocyanate, polyethylene glycol, polypropylene glycol, and polyols derived from natural oils. Nonlimiting examples of monoalcohols that may be used together with the polyols include butanol, octanol, lauryl alcohol, and ethoxylated and propoxylated phenols. Nonlimiting examples of suitable modifying components include compounds which contain a group which is reactive with respect to the functional groups of the polyester, including polyisocyanates and/or diepoxide compounds, and also if desired, monoisocyanates and/or monoepoxide compounds. The polyester polymerization may be carried out by known standard methods. This reaction is conventionally carried out at temperatures of between 180° C. and 280° C., in the presence, if desired, of an appropriate esterification catalyst. Typical catalysts for the esterification polymerization are protonic acids, Lewis acids, titanium alkoxides, and dialkyltin oxides, for example lithium octanoate, dibutyltin oxide, dibutyltin dilaurate, para-toluenesulfonic acid under reflux with small quantities of a suitable solvent as entraining agent such as an aromatic hydrocarbon, for example xylene, or a (cyclo)aliphatic hydrocarbon, for example cyclohexane.

Polyurethanes having hydroxyl functional groups may also be used in the coating compositions along with the branched polyester polyol. Examples of suitable polyurethane polyols include polyester-polyurethanes, polyether-polyurethanes, and polycarbonate-polyurethanes, including, without limitation, polyurethanes polymerized using as polymeric diol reactants polyethers and polyesters including polycaprolactone polyesters or polycarbonate diols. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is being used, are compounds having two or more functional groups, preferably two functional groups, reactive with isocyanate groups, such as the diols, amino alcohols, and diamines. Preferably the polymeric diol-based polyurethane is substantially linear (i.e., substantially all of the reactants are difunctional).

Diisocyanates used in making the polyurethane polyols may be aromatic, aliphatic, or cycloaliphatic. Useful diisocyanate compounds include, without limitation, isophorone diisocyanate (IPDI), methylene bis-4-cyclohexyl isocyanate (H12MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, meta-xylylenediioscyanate and para-xylylenediisocyanate, 4-chloro-1,3-phenylene diisocyanate, 1,5-tetrahydro-naphthalene diisocyanate, 4,4'-dibenzyl diisocyanate, and xylylene diisocyanate (XDI), and combinations of these. Nonlimiting examples of higher-functionality polyisocyanates that may be used in limited amounts to produce branched thermoplastic polyurethanes (optionally along with monofunctional alcohols or monofunctional isocyanates) include 1,2,4-benzene triisocyanate, 1,3,6-hexamethylene triisocyanate, 1,6,11-undecane triisocyanate, bicycloheptane triisocyanate, triphenylmethane-4,4',4"-triisocyanate, isocyanurates of diisocyanates, biurets of diisocyanates, allophanates of diisocyanates, and the like.

In various embodiments, the polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights may be determined by ASTM D-4274.

The reaction of the polyisocyanate, polymeric diol, and diol or other chain extension agent is typically carried out at an elevated temperature in the presence of a suitable catalyst, for example tertiary amines, zinc salts, and manganese salts. The ratio of polymeric diol, such as polyester diol, to extender can be varied within a relatively wide range depending largely on the desired hardness or flexibility of the final polyurethane elastomer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 1:1 to 1:1.05, and more preferably, 1:1 to 1:1.02. The polymeric diol segments typically are from about 35% to about 65% by weight of the polyurethane polymer, and preferably from about 35% to about 50% by weight of the polyurethane polymer.

A polysiloxane polyol may be made by hydrosilylating a polysiloxane containing silicon hydrides with an alkyenyl polyoxyalkylene alcohol containing two or three terminal primary hydroxyl groups, for example allylic polyoxyalkylene alcohols such as trimethylolpropane monoallyl ether and pentaerythritol monoallyl ether.

Any of the polyol resins and polymers described above may be derivatized to have carbamate groups according to known methods, for example by reaction of a hydroxyl-functional material with an alkyl carbamate, for example methyl carbamate or butyl carbamate, through what is referred to as "transcarbamation" or "transcarbamoylation." In other methods of forming carbamate-functional resins and polymers for use in the coating compositions, the resin and polymers may be polymerized using a carbamate-functional monomer.

Crosslinking Component (B)

The coating composition containing the branched polyester polyol in component (A), includes—in case component (A) comprises one or more externally curing components—at least one crosslinking agent or curing agent in crosslinking component (B) such as: aminoplast crosslinkers having active methylol, methylalkoxy or butylalkoxy groups; polyisocyanate crosslinkers, which may have blocked or unblocked isocyanate groups; polyanhydrides; and polyepoxide functional crosslinkers or curing agents, which could be reactive with the hydroxyls as well as with carboxylic acid groups of the branched polyols; or polyamines which could be reactive with epoxy resins that might be contained in component (A).

Aminoplasts, or amino resins, are described in Encyclopedia of Polymer Science and Technology vol. 1, p. 752-789 (1985), the disclosure of which is hereby incorporated by reference. An aminoplast is obtained by reaction of an activated nitrogen with a lower molecular weight aldehyde, optionally with further reaction with an alcohol (preferably a mono-alcohol with one to four carbon atoms such as methanol, isopropanol, n-butanol, isobutanol, etc.) to form an ether group. Preferred examples of activated nitrogens are activated amines such as melamine, benzoguanamine, cyclohexylcarboguanamine, and acetoguanamine; ureas, including urea itself, thiourea, ethyleneurea, dihydroxyethyleneurea, and guanylurea; glycoluril; amides, such as dicyandiamide; and carbamate-functional compounds having at least one primary carbamate group or at least two secondary carbamate groups. The activated nitrogen is reacted with a lower molecular weight aldehyde. The aldehyde may be selected from formaldehyde, acetaldehyde, crotonaldehyde, benzaldehyde, or other aldehydes used in making aminoplast resins, although formaldehyde and acetaldehyde, especially formaldehyde, are preferred. The activated nitrogen groups are at least partially alkylolated with the aldehyde, and may be fully alkylolated; preferably the activated nitrogen groups are fully alkylolated. The reaction may be catalyzed by an acid, e.g. as taught in U.S. Pat. No. 3,082,180, which is incorporated herein by reference.

The optional alkylol groups formed by the reaction of the activated nitrogen with aldehyde may be partially or fully etherified with one or more monofunctional alcohols. Suitable examples of the monofunctional alcohols include, without limitation, methanol, ethanol, n-propanol, isopropanol, n-butanol, isobutanol, tert-butyl alcohol, benzyl alcohol, and so on. Monofunctional alcohols having one to four carbon atoms and mixtures of these are preferred. The etherification may be carried out, for example, the processes disclosed in U.S. Pat. Nos. 4,105,708 and 4,293,692 incorporate the disclosures of which incorporated herein by reference. The aminoplast may be at least partially etherified, and in various embodiments the aminoplast is fully etherified. For example, the aminoplast compounds may have a plurality of methylol and/or etherified methylol, butylol, or alkylol groups, which may be present in any combination and along with unsubstituted nitrogen hydrogens. Examples of suitable curing agent compounds include, without limitation, melamine formaldehyde resins, including monomeric or polymeric melamine resins and partially or fully alkylated melamine resins, and urea resins (e.g., methylol ureas such as urea formaldehyde resin, and alkoxy ureas such as butylated urea formaldehyde resin). One nonlimiting example of a fully etherified melamine-formaldehyde resin is hexamethoxymethyl melamine.

The alkylol groups are capable of self-reaction to form oligomeric and polymeric aminoplast crosslinking agents. Useful materials are characterized by a degree of polymerization. For melamine formaldehyde resins, it is preferred to use resins having a number average molecular weight less than about 2000, more preferably less than 1500, and even more preferably less than 1000.

A coating composition including aminoplast crosslinking agents may further include a strong acid catalyst to enhance the cure reaction. Such catalysts are well known in the art and include, for example, para-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine.

Particularly for refinish coatings, polyisocyanate crosslinkers are commonly used. Examples of suitable polyisocyanate crosslinkers include, without limitation, alkylene polyisocyanates such as hexamethylene diisocyanate, 4- and/or 2,4,4-trimethylhexamethylene diisocyanate, dodecamethylene diisocyanate, 1,4-di isocyanatocyclohexane, 1-isocyanato-3,3,5-trim ethyl-5-isocyanatomethyl-cyclohexane (isophorone diisocyanate), 2,4'- and/or 4,4'-diisocyanatodicyclohexylmethane, 3-isocyanato-methyl-3,5,5-trim ethyl cyclohexyl isocyanate, aromatic polyisocyanates such as 2,4'- and/or 4,4'-diisocyanatodiphenylmethane, 2,4- and/or 2,6-diisocyanatotoluene, naphthylene diisocyanate, and mixtures of these polyisocyanates. Generally, polyisocyanates having three or more isocyanate groups are used; these may be derivatives or adducts of diisocyanates. Useful polyisocyanates may be obtained by reaction of an excess amount of an isocyanate with water, a polyol (for example, ethylene glycol, propylene glycol, 1,3-butylene glycol, neopentyl glycol, 2,2,4-trimethyl-1,3-pentane diol, hexamethylene glycol, cyclohexane dimethanol, hydrogenated bisphenol A, trimethylolpropane, trimethylolethane, 1,2,6-hexanetriol, glycerine, sorbitol or pentaerythritol), or by the reaction of the isocyanate with itself to give an isocyanurate. Examples include biuret-group-containing polyisocyanates, such as those described, for example, in U.S. Pat. Nos. 3,124,605 and 3,201,372 or DE-OS 1,101,394; isocyanurate-group-containing polyisocyanates, such as those described, for example, in U.S. Pat. No. 3,001,973, DE-PS 1,022,789, 1,222,067 and 1,027,394 and in DE-OS 1,929,034 and 2,004,048; urethane-group-containing polyisocyanates, such as those described, for example, in DE-OS 953,012, BE-PS 752,261 or U.S. Pat. Nos. 3,394,164 and 3,644,457; carbodiimide group-containing polyisocyanates, such as those described in DE-PS 1,092,007, U.S. Pat. No. 3,152,162. and DE-OS 2,504,400, 2,537,685 and 2,552,350; allophanate group-containing polyisocyanates, such as those described, for example, in GB-PS 994,890, BE-PS 761,626 and NL-05 7,102,524; and uretdione group-containing polyisocyanates, such as those described in EP-A 0,377,177, each reference being incorporated herein by reference.

Such isocyanate crosslinkers for refinish coating compositions are commonly stored separately and combined with the hydroxyl-functional film-forming components shortly before application. For example, a two-part or two-pack or two-component refinish coating composition may include in a crosslinking part, package, or component one of aliphatic biurets and isocyanurates, such as the isocyanurates of hexamethylene diisocyanate and isophorone diisocyanate.

Curing catalysts for the urethane reaction such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total nonvolatile vehicle.

A dianhydride may also be used to crosslink the branched polyester polyol. Nonlimiting examples of di-cyclic carboxylic anhydrides include pyranyl dianhydride, ethylenediaminetetraacetic dianhydride, cyclobutane-1,2,3,4-tetracarboxylic dianhydride, 3,3',4,4'-biphenyltetracarboxylic dianhydride, tetrahydrofurane-2,3,4,5-tetracarboxylic dianhydride, and cyclohexane-1,2,4,5-tetracarboxylic acid dianhydride.

Polyepoxide crosslinking agents include acrylic polymers having epoxide groups, for example copolymers of allyl glycidyl ether, glycidyl acrylate, or glycidyl methacrylate, as well as polyglycidyl esters and ethers of polyol and polycarboxylic acids.

Solvents, Pigments, Fillers and Additives

The coating composition comprising the branched polyester polyol may further include solvents, pigments, fillers, or customary additives.

Solvents

One or more solvents are preferably utilized in the coating compositions. Solvents are typically used to either dissolve or disperse the branched polyester polyol and other film-forming materials, crosslinkers and additives. In general, depending on the solubility characteristics of the components, the solvent can be any organic solvent and/or water. Solvents may be contained in component (A) and/or component (B) as well as component (C). Preferably, component (C) consist of one or more solvents.

The solvent(s) can a polar organic solvent(s). For example, the solvents may be a polar aliphatic solvents or polar aromatic solvents. Among useful solvents are ketone, ester, acetate, aprotic amide, aprotic sulfoxide, and aprotic amine solvents. Examples of specific useful solvents include ketones, such as acetone, methyl ethyl ketone, methyl amyl ketone, methyl isobutyl ketone, esters such as ethyl acetate, butyl acetate, pentyl acetate, ethyl ethoxypropionate, ethylene glycol butyl ether acetate, propylene glycol monomethyl ether acetate, aliphatic and/or aromatic hydrocarbons such as toluene, xylene, solvent naphtha, and mineral spirits, ethers such as glycol ethers like propylene glycol monomethyl ether, alcohols such as ethanol, propanol, isopropanol, n-butanol, isobutanol, and tert-butanol, nitrogen-containing compounds such as N-methyl pyrrolidone and N-ethyl pyrrolidone, and combinations of these.

However, the liquid medium can also be water or a mixture of water with small amounts of organic water-soluble or water-miscible co-solvents.

The solvent in the coating composition may be present in an amount of from 0.01 weight percent to 99 weight percent, preferably in an amount of from 10 weight percent to 60 weight percent, or in an amount of from 30 weight percent to 50 weight percent.

Pigments and Fillers

When the coating compositions are formulated as basecoat topcoats, monocoat topcoats, or primers they preferably contain pigments and fillers, including special effect pigments. Nonlimiting examples of special effect pigments that may be utilized in basecoat and monocoat topcoat coating compositions include metallic, pearlescent, and color-variable effect flake pigments. Metallic (including pearlescent, and color-variable) topcoat colors are produced using one or more special flake pigments. Metallic colors are generally defined as colors having gonioapparent effects. For example, the American Society of Testing Methods (ASTM) document F284 defines metallic as “pertaining to the appearance of a gonioapparent material containing metal flake.” Metallic basecoat colors may be produced using metallic flake pigments like aluminum flake pigments, coated aluminum flake pigments, copper flake pigments, zinc flake pigments, stainless steel flake pigments, and bronze flake pigments and/or using pearlescent flake pigments including treated micas like titanium dioxide-coated mica pigments and iron oxide-coated mica pigments to give the coatings a different appearance (degree of reflectance or color) when viewed at different angles. Metal flakes may be cornflake type, lenticular, or circulation-resistant; micas may be natural, synthetic, or aluminum oxide type. Flake pigments do not agglomerate and are not ground under high shear because high shear would break or bend the flakes or their crystalline morphology, diminishing or destroying the gonioapparent effects. The flake pigments are satisfactorily dispersed in a binder component by stirring under low shear. The flake pigment or pigments may be included in the coating composition in an amount of about 0.01 wt. % to about 50 wt. % or about 15 wt. % to about 25 wt. %, in each case based on total binder weight. Nonlimiting examples of commercial flake pigments include PALIOCROME® pigments, available from BASF Corporation.

Nonlimiting examples of other suitable pigments and fillers that may be utilized in basecoat and monocoat topcoat coating compositions include inorganic pigments such as titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), and ultramarine, and organic pigments such as metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, nanoparticles based on silicon dioxide, aluminum oxide or zirconium oxide, and so on. The pigment or pigments are preferably dispersed in a resin or polymer or with a pigment dispersant, such as binder resins of the kind already described, according to known methods. In general, the pigment and dispersing resin, polymer, or dispersant are brought into contact under a shear high enough to break the pigment agglomerates down to the primary pigment particles and to wet the surface of the pigment particles with the dispersing resin, polymer, or dispersant. The breaking of the agglomerates and wetting of the primary pigment particles are important for pigment stability and color development. Pigments and fillers may be utilized in amounts typically of up to about 60% by weight, based on total weight of the coating composition. The amount of pigment used depends on the nature of the pigment and on the depth of the color and/or the intensity of the effect it is intended to produce, and also by the dispersibility of the pigments in the pigmented coating composition. The pigment content, based in each case on the total weight of the pigmented coating composition, is preferably 0.5% to 50%, more preferably 1% to 30%, very preferably 2% to 20%, and more particularly 2.5% to 10% by weight.

Clearcoat coating compositions typically include no pigment, but may include small amount of colorants or fillers that do not unduly affect the transparency or desired clarity of the clearcoat coating layer produced from the composition.

Additives

Additional desired, customary coating additives agents may be included, for example, surfactants, stabilizers, wetting agents, dispersing agents, adhesion promoters, UV absorbers, hindered amine light stabilizers such as HALS compounds, benzotriazoles or oxalanilides; free-radical scavengers; slip additives; defoamers; reactive diluents, of the kind which are common knowledge from the prior art; wetting agents such as siloxanes, fluorine compounds, carboxylic monoesters, phosphoric esters, polyacrylic acids and their copolymers, for example polybutyl acrylate, or polyurethanes; adhesion promoters such as tricyclodecanedimethanol; flow control agents; film-forming assistants such as cellulose derivatives; rheology control additives, such as the additives known from patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum-magnesium silicates, sodium-magnesium and sodium-magnesium-fluorine-lithium phyllosilicates of the montmorillonite type; silicas such as Aerosils®; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates; flame retardant; and so on. Typical coating compositions include one or a combination of such additives.

Application of the Coating Compositions

The coating compositions of the invention can be coated by any of several techniques well known in the art. These include, for example, spray coating, dip coating, roll coating, curtain coating, knife coating, spreading, pouring, dipping, impregnating, trickling or rolling, and the like. For automotive body panels, spray coating is typically used. Preference is given to employing spray application methods, such as compressed-air spraying, airless spraying, high-speed rotation, electrostatic spray application, alone or in conjunction with hot spray application such as hot-air spraying, for example.

The coating compositions and coating systems of the invention are employed in particular in the technologically and esthetically particularly demanding field of automotive OEM finishing and also of automotive refinish. The coating compositions can be used in both single-stage and multistage coating methods, particularly in methods where a pigmented basecoat or monocoat coating layer is first applied to an uncoated or precoated substrate and afterward another coating layer may optionally be applied when the pigmented film is a basecoat coating. The invention, accordingly, also provides multicoat coating systems comprising at least one pigmented basecoat and may have least one clearcoat disposed thereon, wherein either the clearcoat or the basecoat has been or both have been produced from the coating composition containing the branched polyester polyol as disclosed herein. Both the basecoat and the clearcoat coating composition, as well as primer compositions can include the disclosed branched polyester polyol.

The applied coating compositions can be cured after a certain rest time or "flash" period. The rest time serves, for example, for the leveling and devolatilization of the coating films or for the evaporation of volatile constituents such as solvents. The rest time may be assisted or shortened by the application of elevated temperatures or by a reduced humidity, provided this does not entail any damage or alteration to the coating films, such as premature complete crosslinking, for instance. The thermal curing of the coating compositions has no peculiarities in terms of method but instead takes place in accordance with the typical, known methods such as heating in a forced-air oven or irradiation with IR lamps. The thermal cure may also take place in stages. Another preferred curing method is that of curing with near infrared (NIR) radiation. Although various methods of curing may be used, heat curing is preferred. Generally, heat curing is affected by exposing the coated article to elevated temperatures provided primarily by radiative heat sources. After application, the applied coating layer is cured, for example with heat at temperatures from 30 to 200° C., or from 40 to 190° C., or from 50 to 180° C., for a time of 1 min up to 10 h, more preferably 2 min up to 5 h, and in particular 3 min to 3 h, although longer cure times may also be employed at the temperatures employed for automotive refinish, which are preferably between 30 and 90° C. The branched polyol can be used for both refinish coatings and for original finish coatings that are cured at higher temperatures. A typical method for applying a refinish coating composition includes application and drying with cure at room temperature or at an elevated temperature between 30 and 90° C. OEM coatings are typically cured at higher temperatures, for example from about 110 to about 135° C. The curing time will vary depending on the particular components used, and physical parameters such as the thickness of the layers, however, typical curing times range from about 15 to about 60 minutes, and preferably about 15-25 minutes for blocked acid catalyzed systems and about 10-20 minutes for unblocked acid catalyzed systems.

Cured primer layers typically have thicknesses of from about 50 μm to about 75 μm. Cured basecoat layers formed may have a thickness of from about 5 to about 75 μm, depending mainly upon the color desired and the thickness needed to form a continuous layer that will provide the color. Cured clearcoat layers formed typically have thicknesses of from about 30 μm to about 65 μm.

The coating composition can be applied onto many different types of substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, primer surfacer, and/or basecoat, cured or uncured.

The substrate may be first primed with an electrodeposition (electrocoat) primer. The electrodeposition composition can be any electrodeposition composition used in automotive vehicle coating operations. Non-limiting examples of electrocoat compositions include electrocoating compositions sold by BASF. Electrodeposition coating baths usually comprise an aqueous dispersion or emulsion including a principal film-forming epoxy resin having ionic stabilization (e.g., salted amine groups) in water or a mixture of water and organic cosolvent. Emulsified with the principal film-forming resin is a crosslinking agent that can react with functional groups on the principal resin under appropriate conditions, such as with the application of heat, and so cure the coating. Suitable examples of crosslinking agents include, without limitation, blocked polyisocyanates. The electrodeposition coating compositions usually include one or more pigments, catalysts, plasticizers, coalescing aids, antifoaming aids, flow control agents, wetting agents, surfactants, UV absorbers, HALS compounds, antioxidants, and other additives.

The electrodeposition coating composition is preferably applied to a dry film thickness of 10 to 35 μm. After application, the coated vehicle body is removed from the bath and rinsed with deionized water. The coating may be cured under appropriate conditions, for example by baking at from about 135° C. to about 190° C. for between about 15 and about 60 minutes.

Because the coatings of the invention produced from the coating compositions of the invention adhere excellently even to electrocoats, surfacer coats, basecoat systems or typical, known clearcoat systems that have already cured, they are outstandingly suitable not only for use in automotive OEM finishing but also for automotive refinish or for the modular scratchproofing of automobile bodies that have already been painted.

Use of the Polyester Polyol as Plasticizers

A further subject of the present invention is the use of the branched polyester polyols as defined above as plasticizers, particularly as plasticizers in coating compositions such as primers, fillers, basecoat and clearcoat.

The plasticizer is typically used in amounts ranging from 0.1% to 2.5% by weight based on total solids of component (A) of the coating formulation.

The following examples illustrate, but do not in any way limit, the scope of the methods and compositions as described and claimed. All parts are parts by weight unless otherwise noted.

EXAMPLES

Synthesis of a Branched Polyester Polyol PP

Step (a)

A reactor was charged with 12.010 parts by weight trimethylolpropane, 6.300 parts by weight adipic acid, and 1.130 parts by weight mixed xylenes. The contents of the reactor were mixed and heated to 230° C. By-product water was removed as it was generated, and the temperature was maintained above 200° C. for about 5 hours, then as much of the xylenes was removed as possible and the reaction product (first intermediate product) was cooled to 90° C.

Step (b)

To the reactor was then added 8.390 parts by weight of molten hexahydrophthalic anhydride (60° C.) and 4.520 parts by weight ethyl 3-ethoxypropionate. The contents of the reactor were stirred and heated to 115° C. After the exotherm peaked (keeping the temperature below 150° C.), the contents of the reactor were heated to 136° C., then cooled again to 90° C., and an additional 16.780 parts by weight of molten hexahydrophthalic anhydride (60° C.) were added followed by a flush of 1.420 parts by weight ethyl 3-ethoxypropionate. The contents of the reactor were stirred and heated to 115° C. After the exotherm peaked (keeping the temperature below 150° C.), the contents of the reactor were heated to 145° C. The temperature was maintained at 145° C. for 90 minutes, then cooled to 140° C. Thus, the second intermediate was formed.

Step (c)

Keeping the temperature between 140 and 148° C., 37.400 parts by weight of Cardura™ E10-P was added over about 90 minutes, followed by a flush of 1.420 parts by weight ethyl 3-ethoxypropionate. The reaction mixture was held at 145° C. for 3 hours, then cooled and reduced with 5.320 parts by weight of Aromatic 100 and 5.310 parts n-butyl acetate. Thus, a branched polyester polyol PP solution (80 wt.-% solids) was obtained.

Clear Coat Composition a (CCC A) According to the Invention

Component (A)

Component (A) was obtained by mixing the ingredients according to Table 1 below. All parts are parts by weight.

TABLE 1

| Ingredient | Parts by weight | Solids parts by weight |
|---|---|---|
| Acrylic resin 1[1] | 74.286 | 40.857 |
| Surface tension reducing additive[2] | 0.214 | 0.214 |
| Levelling agent[3] | 0.514 | 0.514 |
| UV-HALS package[4] | 0.632 | 0.632 |
| Tin Catalyst[5] | 0.060 | 0.060 |
| Acid[6] | 0.177 | 0.177 |
| branched Polyester Polyol PP[7] | 1.015 | 0.812 |
| Alkyleneglycol monoalkylether acetate mixture[8] | 4.640 | 0.000 |

TABLE 1-continued

| Ingredient | Parts by weight | Solids parts by weight |
|---|---|---|
| Alkyl acetate mixture[9] | 6.457 | 0.000 |
| Solvent Naphtha (Petroleum), Light Aromatic | 6.857 | 0.000 |
| Ethyl 3-ethoxypropionate | 5.148 | 0.000 |
| Total | 100.000 | 43.266 |

[1]styrene/acrylic polyol resin 55% solids
[2]polyether-modified polydimethylsiloxane
[3]polyacrylate
[4]Eversorb 5941 ®
[5]Dibutyltin dilaurate
[6]organic acid
[7]branched polyester polyol PP solution (80% solids) as described above
[8]propylene glycol monomethyl acetate/ethylene glycol monobutyl acetate mixture
[9]n-butyl acetate/methyl acetate mixture Based on the total weight solids content of Component (A) only, the branched polyester polyol PP was contained in an amount of approximately 1.9 wt.-%.

Comparative Clear Coat Composition A' (CCC A')

A comparative Clear Coat Composition A' was obtained by mixing the ingredients according to Table 1, but using 1.015 parts by weight of butyl benzyl phthalate instead of the polyester polyol PP.

Crosslinking Component (B)

As a crosslinking component (B) Limco Medium Hardener, i.e. a polyisocyanate crosslinker, available from BASF Corporation, USA.

Diluent Composition (C)

As a diluent component (C) Limco Reducer 12, available from BASF Corporation, USA.

Mixing Ratio

To obtain the coating compositions components (A), (B) and (C) were mixed 8:2:1 by volume.

Based on the total weight solids content of the thus obtained coating composition, the branched polyester polyol PP was contained in the ‘Ready for Use’ formulation in an amount of approximately 1.3 wt.-%.

Preparation of Coatings

Panels used for clear coat testing were e-coated steel which were P400 sanded and cleaned before application of a basecoat layer followed by application of the test clear coat layer. Three different colors of commercial basecoats were used: BASF Supreme Plus Black, BASF Supreme Plus White, BASF Supreme Plus Red. The basecoat layers were sprayed onto the sanded and cleaned e-coat panels to hiding (about 2.5 to 7.6 μm). The basecoat layer was allowed to flash dry at ambient temperature for 10-20 minutes, then the clear coat layer was sprayed to about 50 to 60 μm and allowed to air dry at ambient temperature for 1 week before testing.

Performance Testing

“X” Initial Adhesion Test

The “X” initial adhesion test was carried out according to ASTM D3359, 2017 02, Method A.

“X” Adhesion after 96 hours Humidity

The panels were conditioned for 96 hours in 100% humidity at 37.8° C. (100° F.) per ASTM D1735, 2014 06, then wiped dry and allowed to recover at ambient conditions for 10 minutes before adhesion testing per ASTM D3359, 2017 02, Method A.

Ambient Gravelometer Test

The ambient gravelometer test was carried out according to ASTM D3170, 2014 06.

Cold Gravelometer Test

The panels were conditioned for 24 hours at <(−25° C.), then taken directly to the gravelometer apparatus without recovery for testing per ASTM D3170, 2014 06. Test panels were blotted dry and treated with masking tape to remove 'hanging chads' before evaluating.

Conical Mandrel Test

The conical mandrel test was carried out according to ASTM D522, Method A, 2013.

Cupping Test

The cupping test was carried out according to DIN EN ISO 1520, 2007 11.

In Table 2 the obtained results are shown.

TABLE 2

Test Results of Performance Testing

| Test Method | Basecoat | CCC A inventive | CCC A' phthalate |
|---|---|---|---|
| "X" initial adhesion[1] | Black | 10 | 7 |
| | White | 5 | 5 |
| | Red | 10 | 6 |
| "X" adhesion after 96 h humidity[1] | Black | 5 | 5 |
| | White | 4 | 4 |
| | Red | 5 | 4 |
| Ambient gravelometer[2] | Black | 3B | 3B |
| | White | 6B | 6C |
| | Red | 4B | 4B |
| Cold gravelometer[2] | Black | 4C | 3C |
| | White | 5C | 4C |
| | Red | 4C | 6C |
| Conical mandrel[3] | Black | 0.125 | 0.0625 |
| | White | 0 | 0 |
| | Red | 0 | 0 |
| Cupping[4] | Black | 9.6 | 9.6 |
| | White | 10.1 | 8.8 |
| | Red | 8.9 | 10.6 |

[1]Visual evaluation; 1-10 scale; 10 = best (no defect) and 1 = worst

[2]Visual evaluation; defect diameter A-D scale; A = best (<1 mm) and D = worst (>6 mm); number of defects 1-10 scale; 10 = best (0 defects per prescribed area), 1 = worst (>250 defects per prescribed area)

[3]Visual evaluation; 0-1 scale; 0 = best (no cracking) and 1 = worst (diameter of mandrel in inches at which cracking was first noted)

[4]Measurement of penetration until defect is noticed (visually); 0.1 worst (defect noted at only 0.1 mm) larger number is better (deeper penetration before defect)

Similar plasticizing results were obtained, when highly pigmented primer compositions were formulated, even using an amount of the branched polyester polyol as low as 0.25% by weight, based on the total solids content of the composition.

The invention claimed is:

1. A coating composition comprising, (A) a physically curing, reactively self-curing and/or externally curing component, comprising, based on the total solids content of the coating composition, from 0.1% by weight to 2.5% by weight of a branched polyester polyol, prepared by:

(a) reacting a polyol comprising at least three hydroxyl groups with an aliphatic dicarboxylic acid having from 6 to 36 carbon atoms or an esterifiable derivative of the aliphatic dicarboxylic acid selected from the group consisting of anhydrides of the esterifiable derivative of the aliphatic dicarboxylic acid and esterifiable esters to form a hydroxyl-functional first intermediate product;

(b) reacting the first intermediate product with a cyclic carboxylic acid anhydride to form a carboxylic acid-functional second intermediate product; and (c) reacting the second intermediate product with an epoxide-functional compound having one epoxide group to form the branched polyester polyol;

(B) a crosslinking component, in case component (A) comprises one or more externally curing components; and optionally, (C) a diluent component.

2. The coating composition according to claim 1, wherein a ratio in step (a) of moles of the polyol to moles of the aliphatic dicarboxylic acid or the esterifiable derivative of the aliphatic dicarboxylic acid is from about 2.0 to about 2.2 moles of the polyol per mole of the aliphatic dicarboxylic acid or the esterifiable derivative of the aliphatic dicarboxylic acid.

3. The coating composition according to claim 1, wherein an equivalent ratio in step (b) of hydroxyl groups of the first intermediate product to anhydride groups of the cyclic carboxylic acid anhydride is from about 1.0 to about 1.25 equivalents of the hydroxyl groups per equivalents of the carboxylic anhydride groups.

4. The coating composition according to claim 1, wherein an equivalent ratio in step (c) of carboxylic acid groups of the second intermediate product to epoxide groups of the epoxide-functional compound is from about 1.0 to about 2.5 equivalents of the carboxylic acid groups per equivalents of the epoxide groups.

5. The coating composition according to claim 1, wherein the coating composition is aqueous and wherein an equivalent ratio in step (c) of carboxylic acid groups of the second intermediate product to epoxide groups of the epoxide-functional compound is from about 1.1 to about 2.5 equivalents of the carboxylic acid groups per equivalents of the epoxide groups and unreacted carboxylic acid groups are at least partially neutralized with a base.

6. The coating composition according to claim 1, containing in component (A) one or more resins or polymers selected from the group consisting of (meth) acrylate polymers, epoxy resins, polyesters, polyethers, polyurethanes, polyols based on natural oils and polysiloxanes.

7. The coating composition according to claim 1, wherein component (A) is externally curing and comprises at least one polyol or at least one epoxy resin and component (B) is present and comprises at least one polyisocyanate in case component (A) contains a polyol; or component (B) contains at least one polyamine, in case component (A) contains an epoxy resin.

8. The coating composition according to claim 1, wherein component (A) comprises, based on the total solids content of the coating composition, from 0.2% by weight to 2.0% by weight of the branched polyester polyol.

9. The coating composition according to claim 1, wherein component (A) comprises, based on the total solids content of the coating composition, from 0.25% by weight to 1.8% by weight of the branched polyester polyol.

10. A method of coating a substrate, the method comprising applying to the substrate the coating composition according to claim 1 to form a coating layer and curing the coating layer.

11. The method according to claim 10, wherein the substrate is a metallic substrate, the metallic substrate is coated with an electrodeposition coating, the electrodeposition coating is coated with at least one component selected from the group consisting of a filler, a basecoat and a clearcoat, and wherein at least one of the filler, the basecoat and the clearcoat is the coating layer formed from the coating composition.

12. A method of using a polyester polyol, the method comprising using the polyester polyol as a plasticizer, the polyester polyol being a branched polyester polyol according to claim 1.

13. The method according to claim 12, comprising using the branched polyester polyol as a plasticizer in a coating composition.

14. Method according to claim 12, comprising using the branched polyester polyol as an external and/or an internal plasticizer.

15. The method according to claim 13, comprising using the branched polyester polyol as a plasticizer in the coating composition in an amount from 0.1% by weight to 2.5% by weight based on the total solids content of the coating composition.

16. The method according to claim 13, comprising using the branched polyester polyol as a plasticizer in the coating composition in an amount from 0.2% by weight to 2.0% by weight based on the total solids content of the coating composition.

17. The method according to claim 13, comprising using the branched polyester polyol as a plasticizer in the coating composition in an amount from 0.25% by weight to 1.8% by weight based on the total solids content of the coating composition.

* * * * *